Patented Feb. 20, 1951

2,542,578

UNITED STATES PATENT OFFICE 2,542,578

SULFAMIC-SUBSTITUTED DI-TERTIARY-ALKYL PEROXIDES

Frederick F. Rust, Oakland, and Alan R. Stiles and William E. Vaughan, Berkeley, Calif., assignors to Shell Development Company, San Francisco, Calif., a corporation of Delaware No Drawing. Application February 14, 1949, Serial No. 76,406

11 Claims. (Cl. 260—556)

This invention relates to polyfunctional organic compounds containing a peroxy group, —O—O—, attached to two carbon atoms and also containing the sulfamyl group (—$SO_2NH_2$) or an N-substituted sulfamyl group attached to one or more carbon atoms. The invention is directed to the provision of a novel and valuable series of new compounds, and in a specific embodiment, provides a class of particularly stable organic peroxides having unique chemical properties, i. e., monosubstituted di-tertiary-alkyl peroxides and halogen-containing di-tertiary-alkyl peroxides in which the substituent is a sulfamyl, —$SO_2NH_2$, and alkylsulfamyl, —$SO_2NH$—(alkyl), or an arylsulfamyl, —$SO_2NH$—(aryl), group.

This application is a continuation-in-part of our copending application Serial No. 792,840, filed December 19, 1947, now U. S. Patent 2,519,403. Our earlier filed application describes and claims a novel reaction process by which certain organic peroxides can be sulfohalogenated to form the novel peroxidic sulfonyl halides which are also described and claimed therein. This application describes and claims the class of novel compounds which can be prepared by treating certain peroxidic sulfonyl halides with nitrogen derivatives which are capable of forming amides of sulfonyl halides, under conditions conducive to the formation of amides.

This invention provides novel sulfamyl-substituted organic peroxides containing the peroxy group (—O—O—) between two tertiary carbon atoms. In general, the —O—O— grouping in an organic molecule is so unstable that a compound containing it, if it reacts under a given set of conditions, undergoes a reaction involving the bonds of this grouping. We have now discovered, however, that when the grouping is contained between two tertiary carbon atoms, not only can the compound be sulfohalogenated, but derivatives of the sulfonyl halide can be formed, and such derivatives exhibit both the chemical properties characteristic of the derivative and of the particularly stable class of peroxides.

Illustrative examples of the peroxides provided by the present invention include aliphatic peroxides such as 2-methyl-2-tertiary-butylperoxypropanesulfonanilide, bis (phenylsulfamyl-tertiary-butyl) peroxide, the N,N-diethyl 2-methyl-2-tertiary-hexylperoxypropane sulfonamides, and 2-methyl-2-(bromo-tertiary-butylperoxy) butanesulfonamide; aromatic peroxides such as α,α-dimethylbenzyl propylsulfamyl-tertiary-butyl peroxide, α,α-dimethylbenzyl α-methylsulfamyl-α-methylbenzyl peroxide, and chloro-tertiary-butylperoxy 1,1-dimethyl-3-sulfamylpropyl peroxide. In the sulfamyl-substituted peroxides of the invention that contain in addition to the sulfamyl group or groups a halogen atom, at least one of only the hydrogen atoms on aliphatic carbon atoms that are bonded to carbon and hydrogen exclusively, is replaced by sulfamyl or N-substituted sulfamyl, as the case may be.

The preferred class of compounds provided by the invention consists of substituted di-tertiary-alkyl and halogen-containing di-tertiary-alkyl peroxides in which the substituent groups consist of at least one sulfamyl or hydrocarbonsulfamyl group, i. e., in which the defined sulfamyl groups are the only substituents replacing hydrogen atoms of the di-tertiary-alkyl and halogen-containing di-tertiary-alkyl peroxides. The preferred class is typified by compounds such as 2-methyl - 2 - tertiary-butylperoxypropanesulfonamide, chloro-tertiary-butyl phenylsulfamyl-tertiary-butyl peroxides, and bis(propylsulfamyl-tertiary-butyl)-peroxide.

The compounds provided by the invention are prepared by treating the corresponding sulfonyl chloride or bromide by the procedures applicable to the formation of sulfamyl and N-substituted sulfamyl derivatives of the alkyl or aryl sulfonyl chlorides or bromides. However, as any other organic compounds, the compounds provided by the present invention can be prepared by other methods of synthesis.

In general, one or more —$SO_2Cl$ or —$SO_2Br$ groups contained in an organic peroxide, in which the peroxy group is contained between carbon atoms at least one of which is attached to three carbon atoms, can be converted to sulfamyl groups by any nitrogen derivative suitable for the similar conversion of alkyl or aryl sulfonyl chlorides or bromides. Illustrative examples of the nitrogen derivatives which may suitably be attached through the —$SO_2$— group in the compounds provided by the invention include ammonia; aliphatic primary amines such as isobutylamine, cyclohexylamine, 3,5-dimethylcyclohexylamine, allylamine, 2-choroethylamine, 3-pentenylamine and eicosylamine; aliphatic secondary amines such as dibutylamine, diisopropylamine, dimethallyl-amine, N-methyl cyclopentylamine and dipentylamine; and aromatic amines such as aniline, N-methylaniline, toluidine, N-ethyl p- toluidine, N-allyl aniline and p-bromoaniline. Amines containing not more than about 20 carbon atoms are suitable substituents to be attached through the —$SO_2$— group of the compounds provided by the invention.

A particularly preferred class of compounds provided by the invention are monosubstituted di-tertiary-alkyl peroxides or halogen-containing di-tertiary-alkyl peroxides in which the substituent is a sulfamyl group and the halogen is chlorine or bromine.

Another particularly preferred class of compounds provided by the invention are monosubstituted di-tertiary-alkyl peroxides or halogen-containing di-tertiary-alkyl peroxides in which the substituent is an alkylsulfamyl group and the halogen is chlorine or bromine.

Another particularly preferred class of compounds provided by the invention are monosubstituted di-tertiary-alkyl peroxides or halogen-containing di-tertiary-alkyl peroxides in which the substituent is an arylsulfamyl group and the halogen is chlorine or bromine.

A preferred method of preparing the particularly preferred classes of peroxides comprises the sulfochlorination of a di-tertiary-alkyl peroxide, or its halo-analog; by contacting the peroxide with sulfur dioxide and chlorine, in the liquid phase, in the presence of actinic radiations, at a temperature below the decomposition temperature of the peroxide (the process of our earlier filed application); and neutralizing the sulfochlorination reaction mixture with ammonia or a primary amine or secondary amine. We have found that by following the above procedural steps, the following equations (illustrated by di-tertiary-butyl peroxide and ammonia) express substantially the only reactions by which the reactants are converted:

$$H-CH_2-C(CH_3)_2OOC(CH_3) \xrightarrow[SO_2+Cl_2]{\text{actinic light}}$$
$$(CH_3)_3COOC(CH_3)_2CH_2-SO_2Cl + HCl$$

$$(CH_3)_3COOC(CH_3)_2CH_2-SO_2Cl \xrightarrow{2NH_4OH}$$
$$(CH_3)_3COOC(CH_3)_2CH_2SO_2NH_2+NH_4Cl+2H_2O$$

(Where a valuable amine is used, it can be conserved by employing an equimolar amount of a tertiary amine or an inorganic base in place of one molar portion of the amine.)

Because of the complexity of their structure, specific examples, illustrative of the particularly preferred classes of compounds provided by the invention, can be most clearly presented as the reaction products obtained in the above manner from: (A) a peroxide such as di-tertiary-butyl peroxide, chloro-di-tertiary butyl peroxide, di-tertiary-amyl peroxide, bromo-tertiary-butyl 1,1-dimethylbutyl peroxide and bis(chloro-tert-butyl)peroxide; and (B) ammonia or a primary amine such as methylamine, butylamine, heptylamine, decylamine, isopropylamine, tertiary-butylamine, aniline, m-toluidine and mesitylamine. Amines and peroxides containing not more than 10 carbon atoms are of the molecular size preferred in the production of the particularly preferred compounds of the invention.

The compounds provided by the invention are especially valuable in that they make available for the first time organic peroxides capable of being ionized and containing the peroxy group in the structural arrangement described above. This arrangement, in which the peroxy group is contained between two tertiary carbon atoms, has been found to render the peroxides containing it more inert to shock, conditions of storage, and the like, than the general class of peroxides in which the group is contained in other structural arrangements. The preferred class of compounds, in addition, provide the first peroxides containing this advantageous structural arrangement and having a tendency to be soluble in an alkaline medium and insoluble in an acid medium. The increase in their solubility in ionic media has provided in the present compounds particularly valuable reagents for free radical initiated reactions; such as emulsion polymerization reactions and the like, conducted in such media; and reactions in which a source of oxygen is desired, such as bleaching processes, which are advantageously conducted in an alkaline aqueous medium.

The following examples are presented to illustrate in detail the method of preparing particular sulfamic-substituted peroxides. As many variations in the reactants and reaction conditions are within the scope of the invention, the invention is not to be construed as being limited to the particular compounds specified in the examples.

Example I

A sulfonyl chloride suitable for conversion to a sulfonamide provided by the present invention, is prepared by the following procedure. In a transparent reaction vessel 146 grams (1.0 mole) of di-tertiary-butyl peroxide is illuminated by a 500 watt lamp and maintained at from 6° C. to 80° C. A gaseous mixture of 0.3 mole of sulfur dioxide with 0.2 mole of chlorine is introduced over a period of 1.5 hours. The crude 2-tertiary-butylperoxy-2-methylpropanesulfonyl chloride is isolated by distilling off the dissolved gases and unreacted peroxide.

Example II

The sulfonanilide of the sulfonyl chloride produced in the manner described in Example I is prepared by slowly adding to 60 grams of the crude product 24 grams (0.25 mole) of aniline. The product is separated by filtering the reaction mixture.

The sulfonanilide prepared in the above manner is 2-tertiary-butylperoxy-2-methylpropanesulfonanilide M. P. 91.6–92.4° C.

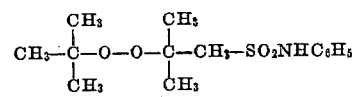

Example III

The sulfonamide of the sulfonyl chloride produced in the manner described in Example I is prepared by slowly adding 60 grams of the crude product to a mixture of 25 grams of concentrated ammonium hydroxide and 25 grams of ice. The product is separated by filtering the reaction mixture.

The sulfonamide prepared in the above manner is 2-tertiary-butylperoxy-2-methylpropanesulfonamide,

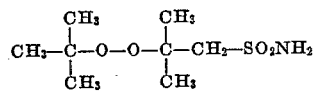

Example IV

A N-aliphatic sulfonamide of the sulfonyl chloride produced in the manner described in Example I is prepared by maintaining at about 20° C. a well-stirred mixture of 6 grams of the crude product, 3.9 grams (0.03 mole) of dibutylamine and 50 grams of a 10 per cent solution of aqueous sodium hydroxide. The product is separated by cooling and filtering the reaction mixture or by the extraction procedures applicable to the isolation of an alkyl or aryl sulfonamide.

The product prepared in the above manner is N,N-dibutyl 2-tertiary-butylperoxy-2-methylpropanesulfonamide,

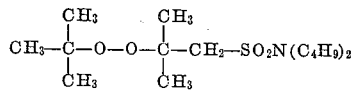

*Example V*

An N-arylsulfamyl-substituted aromatic peroxide is produced by agitating, at room temperature, a mixture of 25 grams (0.10 mole) of $\alpha,\alpha$-dimethylbenzyl p - sulfonylchloro -$\alpha,\alpha$- dimethyl - benzyl peroxide, and 18.6 grams (0.20 mole) of aniline, for about 5 hours. The product is separated by removing the amine hydrochloride by extraction with water and filtering the reaction mixture, or by other procedures applicable to the isolation of an alkyl or aryl sulfonamide.

The product prepared in the above manner is $\alpha,\alpha$-dimethylbenzyl $\alpha$-methyl-$\alpha$-(phenylsulfamyl-methyl)benzyl peroxide.

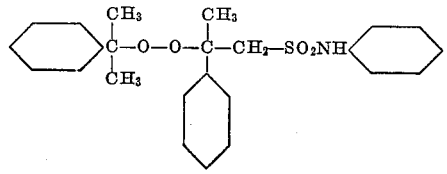

*Example VI*

A sulfamyl-substituted halogen-containing organic peroxide is produced by pouring 28 grams (0.10 mole) of chloro-tertiary-butyl chlorosulfonyl-tertiary-butyl peroxide into a mixture of 30 grams of concentrated ammonium hydroxide and 30 grams of ice maintained at 0° C. The product is separated by allowing the mixture to reach room temperature and filtering.

The product produced in the above manner is chloro - tertiary - butyl sulfamyl - tertiary - butyl peroxide

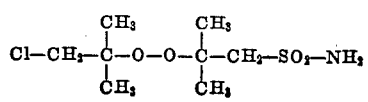

We claim as our invention:

1. 2-tertiary-butylperoxy-2-methylpropanesulfonanilide.
2. 2-tertiary-butylperoxy-2-methylpropanesulfonamide.
3. N,N-dibutyl 2-tertiary-butylperoxy-2-methylpropanesulfonamide.
4. A di-tertiary-alkyl peroxide in which one hydrogen atom is replaced by sulfamyl.
5. A di-tertiary-alkyl peroxide in which one hydrogen atom is replaced by N-alkylsulfamyl.
6. A di-tertiary-alkyl peroxide in which one hydrogen atom is replaced by N-arylsulfamyl.
7. A di-tertiary-alkyl peroxide in which at least one hydrogen atom is replaced by —$SO_2NH_2$.
8. A di-tertiary-alkyl peroxide in which at least one hydrogen atom is replaced by —$SO_2N$(-alkyl)$_2$.
9. A di-tertiary-alkyl peroxide in which at least one hydrogen atom is replaced by —$SO_2NH$(aryl).
10. An organic peroxide in which the peroxy group is directly attached by one bond to a tertiary carbon atom of a tertiary alkyl radial and by the other bond to a tertiary carbon atom of a chlorine-substituted tertiary-alkyl radical, in which peroxide at least one of only the hydrogen atoms of said first-mentioned tertiary-alkyl radical is replaced by sulfamyl.
11. An organic peroxide in which the peroxy group is directly attached to a tertiary aliphatic carbon atom in each of two radicals selected from the class consisting of tertiary-alkyl radicals, aralkyl radicals containing a tertiary aliphatic carbon atom, and halogen-substituted tertiary-alkyl radicals, in which peroxide at least one of only the hydrogen atoms on aliphatic carbon atoms that are bonded to carbon and hydrogen exclusively, is replaced by a substituent group selected from the class consisting of sulfamyl, N-alkylsulfamyl, and N-arylsulfamyl.

FREDERICK F. RUST.
ALAN R. STILES.
WILLIAM E. VAUGHAN.

No references cited.